(12) United States Patent
Ahuja et al.

(10) Patent No.: US 8,542,751 B2
(45) Date of Patent: Sep. 24, 2013

(54) TECHNIQUES FOR IDENTIFYING AND REDUCING BLOCK ARTIFACTS

(75) Inventors: Nilesh A. Ahuja, Chandler, AZ (US); Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 12/860,276

(22) Filed: Aug. 20, 2010

(65) Prior Publication Data

US 2012/0044989 A1  Feb. 23, 2012

(51) Int. Cl.
*H04N 11/02* (2006.01)

(52) U.S. Cl.
USPC ................................. 375/240.29; 375/240.3

(58) Field of Classification Search
USPC ....................................... 375/240.01–240.29
See application file for complete search history.

(56) References Cited

U.S. PATENT DOCUMENTS

| | | | | |
|---|---|---|---|---|
| 5,475,428 A * | 12/1995 | Hintz et al. | | 348/263 |
| 6,335,990 B1 * | 1/2002 | Chen et al. | | 382/261 |
| 6,404,461 B1 * | 6/2002 | Le Clerc | | 348/700 |
| 6,825,886 B2 * | 11/2004 | Kobayashi et al. | | 348/405.1 |
| 6,983,079 B2 | 1/2006 | Kim | | |
| 7,432,936 B2 * | 10/2008 | Woodbury, Jr. | | 345/582 |
| 8,194,918 B2 * | 6/2012 | Das Gupta et al. | | 382/100 |
| 8,326,052 B2 * | 12/2012 | Hattori | | 382/232 |
| 2003/0119450 A1 * | 6/2003 | Vannatta et al. | | 455/67.1 |
| 2005/0013494 A1 | 1/2005 | Srinivasan et al. | | |
| 2006/0152621 A1 * | 7/2006 | Orlick | | 348/448 |
| 2007/0064816 A1 * | 3/2007 | Chiang et al. | | 375/240.29 |
| 2010/0033633 A1 | 2/2010 | Dane et al. | | |
| 2010/0202327 A1 * | 8/2010 | Mushkin et al. | | 370/280 |
| 2011/0129020 A1 * | 6/2011 | Li et al. | | 375/240.29 |
| 2011/0255606 A1 * | 10/2011 | Ojo | | 375/240.24 |
| 2012/0033040 A1 * | 2/2012 | Pahalawatta et al. | | 348/43 |

FOREIGN PATENT DOCUMENTS

WO    2010016820 A1    2/2010

OTHER PUBLICATIONS

Paek et al., "On the POCS-Based Postprocessing Technique to Reduce the Blocking Artifacts in Transform Coded Images", IEEE Transactions On Circuits and Systems for Video Technology, vol. 8, No. 3, Jun. 1998, pp. 358-367.

Averbuch et al., "Deblocking of Block-Transform Compressed Images Using Weighted Sums of Symmetrically Aligned Pixels", IEEE Transactions On Image Processing, vol. 14, No. 2, Feb. 2005, pp. 200-212.

(Continued)

*Primary Examiner* — David Czekaj
*Assistant Examiner* — Leron Beck
(74) *Attorney, Agent, or Firm* — Glen B Choi

(57) ABSTRACT

Techniques are described that can be used to identify blocking artifacts in both vertical and horizontal directions. For blocking artifacts in a vertical direction, a horizontal gradient is determined for a pixel. Gradient smoothing is performed for pixels in the row of the pixel. A ratio of the horizontal gradient over the gradient smoothing is determined. Any pixel with a ratio above a threshold and in a segment with a length that exceeds a threshold length as potentially having block artifacts. Each column with pixels that potentially have block artifacts is inspected to determine whether a number of block artifacts in the column are a local maximum and whether there is a sufficient number of blocking artifacts in the column. Columns that satisfy both conditions are considered to include blocking artifacts.

18 Claims, 5 Drawing Sheets

(56) References Cited

OTHER PUBLICATIONS

Wu et al., "An Efficient Wavelet-Based Deblocking Algorithm for Highly Compressed Images", IEEE Transactions on Circuits and Systems for Video Technology, vol. 11, No. 11, Nov. 2001, pp. 1193-1198.

International Search Report and Written Opinion for PCT Patent Application No. PCT/US2011/046496, mailed on Mar. 2, 2012, 8 pages.

* cited by examiner

TECHNIQUES FOR IDENTIFYING AND REDUCING BLOCK ARTIFACTS

FIELD

The subject matter disclosed herein relates generally to techniques for identifying and reducing blocking artifacts.

RELATED ART

Video compression is employed for storage and transmission of video sequences to increase storage efficiency and to reduce bandwidth used to transmit video. Popular video standards such as MPEG and H.264 employ block-based compression techniques to achieve a reduction of bit-rate. In such techniques, each frame of the video is first partitioned into a set of disjointed blocks of fixed size. Advanced compression schemes are then applied to reduce the number of bits to code each block. An unwanted consequence of compression is the presence of visible blocking artifacts in the decoded video. In some cases, the greater the amount of compression of the video sequence, the stronger the blocking artifacts.

De-blocking is a post-processing process whose goal is to reduce or remove blocking artifacts and improve the visual quality of the decoded video. Some existing de-blocking techniques assume that the blocks are of a known size (such as 8×8 pixels) and/or that information about the strength of the blocking artifacts is available from the decoder in the form of quantization parameters. However, in video post-processing, block size and/or quantization parameters may not always be available from the decoder. Moreover, the size of the blocks may not necessarily be fixed and may depend on several factors, including:

a. The coding method adopted (for example, MPEG or H.264).
b. The scanning method adopted (progressive or interlaced).
c. The scaling applied to the image.
d. Use of motion compensation techniques in video compression, which results in the shifting of block boundaries from their typical positions.

Accordingly, such techniques may not perform effective de-blocking of images or videos containing blocks of non-standard sizes or those containing shifted blocks due to motion compensation in compressed video sequences. In some cases, there may be residual blockiness where block artifacts were not detected or the output image may suffer from loss of detail resulting from applying smoothing throughout the image.

Various techniques to perform de-blocking are described in the following articles: Hoon Paek, Rin-Chul Kim, and Sang-Uk Lee, "On the POCS-Based Postprocessing Technique to Reduce the Blocking Artifacts in Transform Coded Images," IEEE Transactions On Circuits And Systems For Video Technology, Vol. 8, No. 3, June 1998, pp. 358-367.

Amir Z. Averbuch, Alon Schclar, and David L. Donoho, "Deblocking of Block-Transform Compressed Images Using Weighted Sums of Symmetrically Aligned Pixels," IEEE Transactions On Image Processing, Vol. 14, No. 2, February 2005, pp. 200-212.

Shuanhu Wu, Hong Yan, and Zheng Tan, "An Efficient Wavelet-Based Deblocking Algorithm for Highly Compressed Images," IEEE Transactions On Circuits And Systems For Video Technology, Vol. 11, No. 11, November 2001.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments attempt to reduce blocking artifacts in compressed images and videos. Various embodiments estimate the location and strength of the blocking artifacts in each image and attempt to distinguish between blocks in smooth regions of an image and blocks in regions of high detail. Consequently, blockiness can be reduced in compressed images and videos that have smooth or detailed regions or non-uniform sized blocks while at the same time retaining the level of sharpness of the input.

Blocking artifacts caused by compression can be modeled as true step-edges in either the horizontal or the vertical directions. The location of blocking artifacts can be determined by searching for such step edges. Accordingly, edges in natural images, which are rarely true steps, may not be incorrectly detected as blocks by this technique. Nonetheless, constraints are placed to attempt to detect true block artifacts with a high degree of confidence. Once the location of the artifacts is known, the strength of blockiness at each location is measured. The strength of blockiness can be used to control the parameters of an adaptive de-blocking filter or used in other ways.

Figure 1:
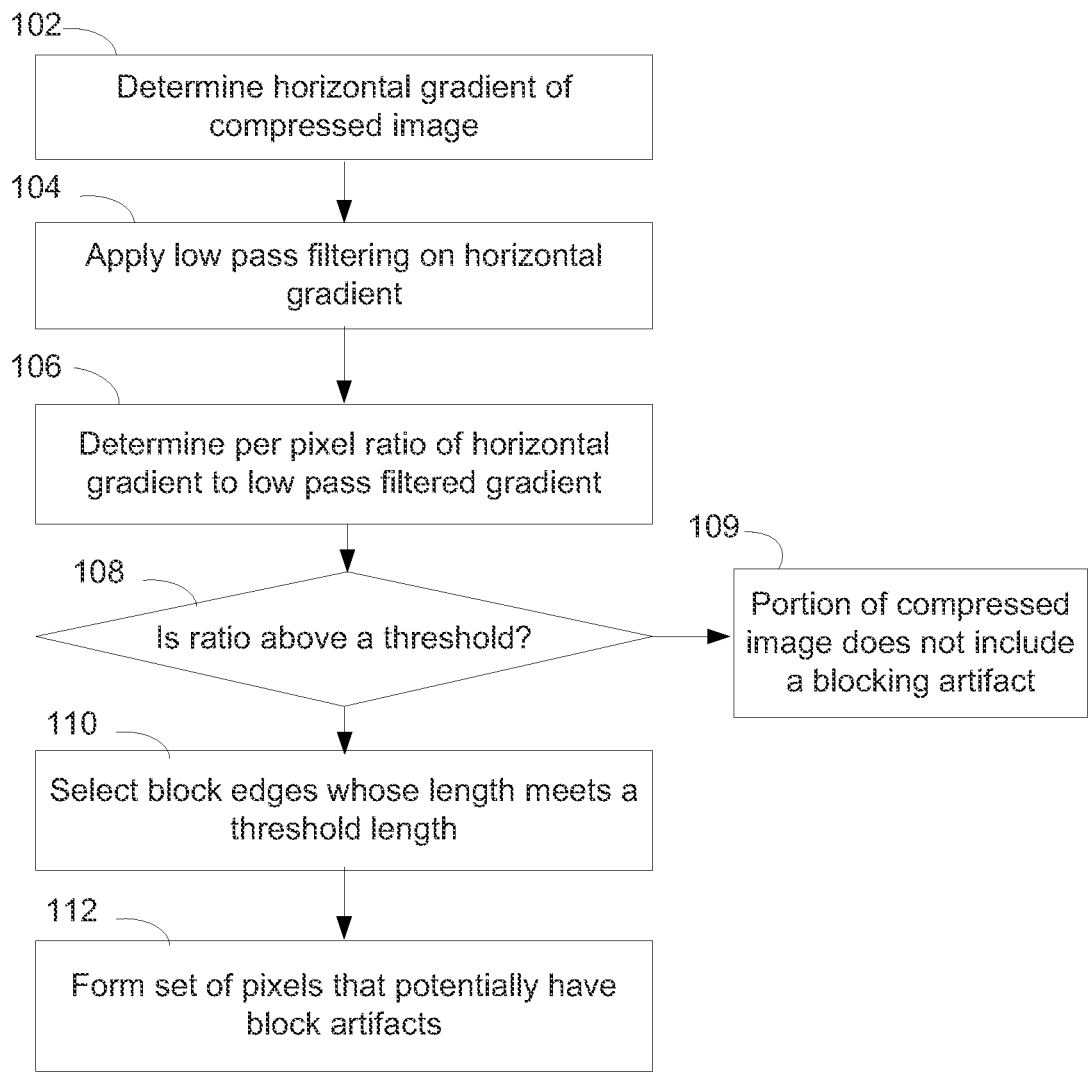
FIGS. 1 and 2 depict example processes that can be used to detect vertical block-edges in smooth image regions.

FIG. 1 depicts an example process to detect vertical block edges in smooth image regions. A smooth image region can be a region with a slow variation in image from one block to the next. Block 102 includes determining a horizontal gradient of a compressed image. A horizontal gradient can be used to find sudden changes in intensity, where intensity describes brightness of pixels. Y[m,n] is the luminance or intensity value at pixel coordinate (m,n), where m values increase along the −y axis and n values increase along the +x axis. Given a compressed image Y[m,n], the absolute value of the horizontal gradient of Y[m,n] can be determined as follows:

$$G_H[m,n] = |Y[m,n] - Y[m,n-1]|,$$

The horizontal gradient is an absolute value of a difference between adjacent pixels in the same row. The step-size of a block edge at (m,n) is the value of horizontal gradient $G_H$ at (m,n). Block 102 repeats for every pixel coordinate in a row to determine the horizontal gradient for every pixel in a row.

To determine a vertical gradient, an absolute value of a difference between adjacent pixels in the same column is determined.

Block 104 commences after the horizontal gradients of all pixels in a row have been determined. Block 104 includes determining a low-pass filtered version of horizontal gradients in the row of the pixel at location [m,n]. Applying a low-pass filter aids in the detection of step-edges that are representative of blocking artifacts. A low-pass filtered version of each pixel in the same row as that of the pixel at location [m,n] can be calculated using:

$$A_H[m, n] = (1/(2N+1)) \sum_{k=-N}^{N} G_H[m, n-k],$$

where

2N+1 is the length of the filter kernel in the row of the pixel at location [m,n] and the current pixel is the center of the row.

For detection and measurement of horizontal block edges, block 104 can be used except that a low pass filtered version of each pixel in the same column as that of the pixel at location [m,n] is calculated.

Block 106 includes determining a pixel-wise change in intensity for pixels in the same row. For example, a pixel-wise ratio of the horizontal gradient to the low-pass filtered version of the horizontal gradient can be determined. The pixel-wise ratio of the horizontal gradient, $G_H[m,n]$, to the low-pass filtered version of pixels in a row, $A_H[m,n]$, can be determined as follows:

$$R_V[m, n] = \frac{G_H[m, n]}{A_H[m, n]}$$

Block 108 includes determining whether the ratio exceeds a threshold. Sudden changes in intensity in an image can be due to block artifacts or changes in textures in an image. It can be proven mathematically that the maximum value of the pixel wise ratio determined in block 106 is 2N+1 and is achieved for true step edges, where N is an integer. A value of N=2 is found to give satisfactory detection of block-edges. Many real world images may contain some amount of noise. In such case, a block-edge can be modeled as a step edge corrupted by additive noise. It can be proven that the value of $R_v[m,n]$ for such corrupted edges is lower than the theoretical maximum. Accordingly, instead of identifying the pixels where $R_v[m,n]$ attains its maximum value, a search is conducted for pixels where $R_v[m,n]$ is greater than some threshold T, where T≦2N+1. These pixels are then identified as potential block edges. Accordingly, if the pixel-wise ratio is greater than a threshold T, then block 110 follows block 108. If the pixel-wise ratio is less than or equal to a threshold T, then block 109 follows block 108.

In some applications, T can be set to a fixed value specified by a user. Threshold T can be set as a function of the noise level in the image (which is either known or measured by other means). In video applications, T may be adaptively set to a value for each input video frame depending on the noise level in each frame.

For images or videos having only compression artifacts, the choice of T involves a trade-off between missed detections (true block artifacts that are not detected) and false alarms (pixels that are false detected as having block artifacts). The higher the value of T, the fewer the false alarms. However, there is a greater chance that true block-edges will be left out. For N=2, a value of T=4 is found to give satisfactory results. The presence of random noise in the compressed image sequence may adversely impact the performance of the blockiness detector. For images or video that contain both compression and random noise, the mean or expected value of $R_V[m,n]$ for step-edges of size h is given by:

$$\frac{2N+1}{1+3.989(\sigma/h)},$$

where $\sigma^2$ is the variance of the random noise.

Thus, in general the presence of random noise lowers the threshold T that should be used for detection of block edges. Using the above relation, T can be set as a function of the noise level in the image. The noise level itself may either be known or can be measured such as by estimating the standard deviation of the image in flat regions. In video applications, T may be adaptively set to a value for each input video frame depending on the noise level in each frame.

Block 109 indicates that the pixel at coordinates m and n do not include a blocking artifact.

Block 110 includes selecting block edges whose length meets a threshold length. Amongst the pixels identified by block 108, it is likely that there will be some isolated false positives. To eliminate these isolated false positives, block 110 performs a consistency check to determine if the adjacent pixels that may include blocking artifacts and are in the same column have a minimum length, CLENGTH. If the adjacent detected pixels have length less than CLENGTH, then these detected pixels are treated as false classifications. In some embodiments, a pixel location (m, n) is classified as a vertical block edge location if the following is true:

(m−k+1,n),(m−k+2,n), . . . ,(m−k+CLENGTH,n) are all potential block edges for any k∈{1, 2, . . . ,CLENGTH}.

For detection and measurement of horizontal block edges, adjacent detected pixels that include blocking artifacts and are in the same row are compared against value CLENGTH.

Fixing a value of CLENGTH involves a tradeoff between false positives and missed block-edges. Setting CLENGTH to 1 implies that every potential block-edge detected by block 108 is classified as a true block-edge. Setting CLENGTH to high values may result in some true block-edges not being classified as block-edges.

Block 112 forms a set of pixels that potentially have block artifacts (denoted $\Omega_V$). The pixels that pass the tests of blocks 108 and 110 are included in the set of pixels that potentially have block artifacts.

Figure 2:
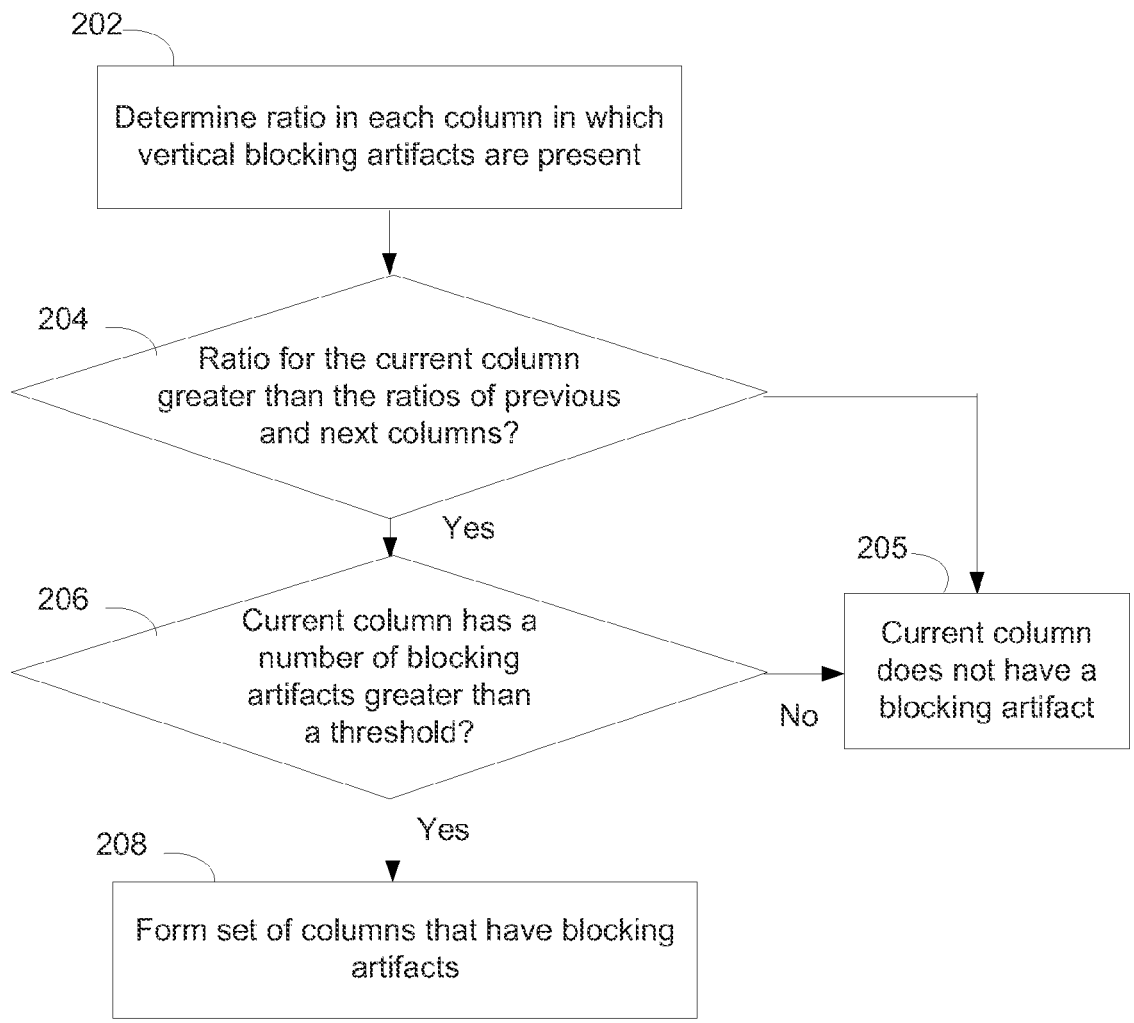

A textured image region can include many changes in color and image intensity and block boundary detection may be more difficult in textured image regions than in smooth image regions. In textured regions, block artifacts may not always manifest themselves as step edges and hence may not be detected using the process of FIG. 1. FIG. 2 depicts a process for detection of vertical block-edges in textured image regions. An input to the process of FIG. 2 is an output from the process of FIG. 1, namely pixels identified as potentially having block artifacts. However, the process of FIG. 1 is used on images regardless of whether images are smooth or textured.

Block 202 includes determining a number of pixel locations in each column in which vertical blocking artifacts are present. The pixel locations in which vertical blocking artifacts are present can be provided from block 112 of FIG. 1.

This number can be normalized using the height of the image/video frame in order to make the subsequent steps resolution-independent. This normalized fraction is denoted as BV[k], where k is the column index, can be used to represent the ratio. For example, if the image is 720×480 pixels, a ratio for each of the 720 columns can be determined. In some cases, BV[k] is determined as:

"Number of block artifacts in column"/"length of column"

The number of pixel locations in each column in which vertical block artifacts are present can be a number of pixels identified in block 112 of FIG. 1. The length of a column can be a number of pixels in a column. For example, if an image is 720×480 pixels, then a length of a column is 480.

Block 204 includes determining whether the ratio for the current column is greater than the ratios of previous and next columns. Block 204 determines if the current column is a spike relative to adjacent columns. A spike is a local maximum. A local maximum represents that column has blocking artifacts. BV[k−1] represents a ratio of the previous column and BV[k+1] represents a ratio of the next column. Block 204 includes determining if BV[k] is larger than both columns BV[k−1] and BV[k+1]. Some pixels of columns BV[k−1] and BV[k+1] could contain pixels that have blocking artifacts. Attempts are made to identify columns that have a greater percentage of pixels that have blocking artifacts as compared to their neighbors. If the ratio for the current column is greater than the ratios of previous and next columns, then block 206 follows block 204. If the ratio for the current column is not greater than the ratios of previous and next columns, then block 205 follows block 204.

Other types of comparisons can be performed such as whether the ratio for the current column is some percentage greater than the ratios of adjacent columns.

Block 206 includes determining whether the current column has a ratio BV[k] that is greater than a threshold TBV. If the threshold is met or exceeded, then the column is considered to include a blocking artifact.

If the image has been a priori classified into smooth or textured regions via a segmentation process, then this threshold may be set in a region-adaptive fashion. In the absence of such information, a single threshold may be set for the entire image. Such a global threshold can be determined experimentally or may automatically be assigned some reasonable value such as 0.15 (15%). In some embodiments, for each column whose ratio exceeds a threshold, block 208 follows block 206. In some embodiments, for each column whose ratio does not exceed a threshold, block 205 follows block 206.

Block 208 aggregates a set of columns whose local ratio of BV[k] exceeds a threshold, TBV. The columns in this set are the ones most likely to correspond to true blocking artifacts. In this set of columns, there will be locations that were not detected as block artifacts by the procedure of FIG. 1. These locations will likely be in textured/detailed areas of the image because otherwise the proposed detection technique would have already detected block artifacts in the smooth areas using the process of FIG. 1. By the process of FIG. 2, not only are the locations of block artifacts known, it is also known whether they occur in a smooth region or in a region with details.

For colored images, detection schemes can be applied to each individual color plane. A colored image includes three color planes (RGB, or YUV). The procedure described here applies to a single color plane (say R of RGB, or Y of YUV). The entire process can be repeated for each of the colored planes.

Thus, by applying the processes of FIGS. 1 and 2, the location and the strength of block-artifacts can be detected in a compressed image with high accuracy. The location and strength of block artifacts can be used to control the strength of an adaptive de-blocking filter to reduce the visibility of block artifacts. The strength of the block artifacts determined can be used to set the strength of de-blocking filtering. A different de-blocking filter can be used for each strength level of block artifacts. Accordingly, adaptive de-blocking filtering can be applied for removing blockiness, where blockiness is present while retaining the level of detail in the input image.

The following describes a manner to determine strength of blocking artifacts. If a potential block edge is detected at location (m,n), then the step-size of that block edge is used to classify the edge as STRONG, MEDIUM, or WEAK. The step-size of the block edge at (m,n) can be the value of the gradient $G_H$ at (m,n) (determined in block 102 of FIG. 1). In some embodiments, block strength classification can be:

```
If G_H[m,n] < LOW_TH
    BCLASS[m,n] = WEAK
else if G_H[m,n] < MED_TH
    BCLASS[m,n] = MEDIUM
else
    BCLASS[m,n] = STRONG
end.
```

The default value of LOW_TH is chosen to be 6 and the default value of MED_TH is chosen to be 16. Variable BCLASS stores the strengths of the detected blocks.

The strength of the block artifacts can be used to set the strength of a de-blocking filter. This may be done on a per-image basis by determining the average strength of blockiness in an image, or may be done on a per-pixel basis by using the strength of blockiness at each pixel to adaptively determine the strength of deblocking for that pixel.

The average value of the gradient $G_H[m,n]$ can be calculated for pixels that have been classified as strong block artifacts (BCLASS[m,n]=STRONG). This average value, which is denoted as VSTRONG_METRIC, represents the average strength of blockiness for pixels that are classified as strong vertical block artifacts. Variable VSTRONG_METRIC can be used in the filtering of strong blocking artifacts. For weak strength artifacts, the value of LOW_TH=6 is used and for medium strength artifacts, the value of MEDIUM_TH=16 is used.

A de-blocking filter is to convert a sharp block edge to a smoother ramp edge. If a block artifact is present at location (m,n), then the de-blocking filter can be applied to a neighborhood of pixels at that location of the detected block artifacts. For vertical block artifacts, this neighborhood of pixels is defined as follows:

$$N_V(m,n)=\{(m,n+k),-FWIDTH\leq k\leq FWIDTH\}.$$

The default value of FWIDTH is chosen to be four (4), although other values can be used. Similarly, for horizontal block artifacts, a neighborhood of pixels are vertically offset from the pixel of interest.

If the strength of the blocking artifact at (m,n) is given by BCLASS[m,n], then all the points in the neighborhood of pixels $N_v(m,n)$ are also classified as having strength BCLASS[m,n]. In the event that a pixel (x, y) belongs to the neighborhood of more than one block artifact, then, the conflict is resolved by giving the higher strength to pixel (x,y). The following pseudo-code can be applied.

```
If BCLASS [m₁,n₁] > BCLASS [m₂,n₂]
   then BCLASS[x,y] = BCLASS [m₁,n₁]
else
   BCLASS [x,y] = BCLASS [m₂,n₂]
end.
```

The complete set of points where the vertical de-blocking filter is applied therefore includes the points where a block artifact has been detected, along with the corresponding neighborhoods of such points. Mathematically, $$\Omega_V = \bigcup_{(m,n) \text{ is a block location}} N_V(m, n)$$

Removal of blocking artifacts can involve applying a bilateral filter in a neighborhood of points around the pixel locations with detected blocking artifacts. The parameters of the bilateral filter applied at a particular pixel location are adaptively determined by the strength of the blocking artifact present at that location (i.e., weak, medium, or strong). One possible procedure is described next.

For each pixel in the set of pixels that potentially has block artifacts ($\Omega_V$), a bilateral filter is applied along the horizontal direction (for a row of pixels) to obtain the output filtered pixel value $y_o[m,n]$ using the following relationship:

$$y_o[m, n] = \frac{\sum_{k=-4}^{4} w_d(n, k) w_r(x[m, n], x[m, k]) x[m, k]}{\sum_{k=-4}^{4} w_d(n, k) w_r(x[m, n], x[m, k])}.$$

where, $$w_d(n,k) = e^{-(n-k)^2/2\sigma_d^2},$$

$$w_r(x[m,n], x[m,k]) = e^{-(x[m,n] - x[m,k])^2/2\sigma_r^2}.$$

The amount of smoothing produced by the filter is controlled by the estimated artifact strength. The filter is designed such that step edges of strengths comparable to the estimated artifacts strength are filtered out (thereby reducing blockiness) but edges of greater strength are effectively left intact.

It was determined experimentally that $\sigma_d = 1.67$ results in superior visual quality of the filtered output. Other values can be used.

Value $\sigma_r$ can be chosen as follows:

```
If (BCLASS[m,n] == WEAK)
   σ_r = 6;
else if (BCLASS[m,n] == MEDIUM)
   σ_r = 16;
else
   σ_r = VSTRONG_METRIC;
end.
```

VSTRONG_METRIC represents the average strength of gradient for pixels that are classified as being strong vertical block artifacts.

The removal of horizontal block artifacts involves the same filtering operations as those for vertical block artifacts, except that 1-D row filtering is replaced by 1-D column filtering.

It is known that the block artifacts are most visible in smooth regions and that the presence of textures/fine details masks to a certain degree the presence of blocking artifacts. Thus, based on the information obtained by the above procedure, the strength of a deblocking filter could be made stronger in smooth regions and reduced in textured details. This has the effect of significantly reducing the perception of blockiness while at the same time retaining the level of detail in the image or video.

If a de-blocking filter can be used between the decoder and encoder of a transcoder, the quality of the transcoded output be improved for a given compression level/bitrate.

Figure 3:
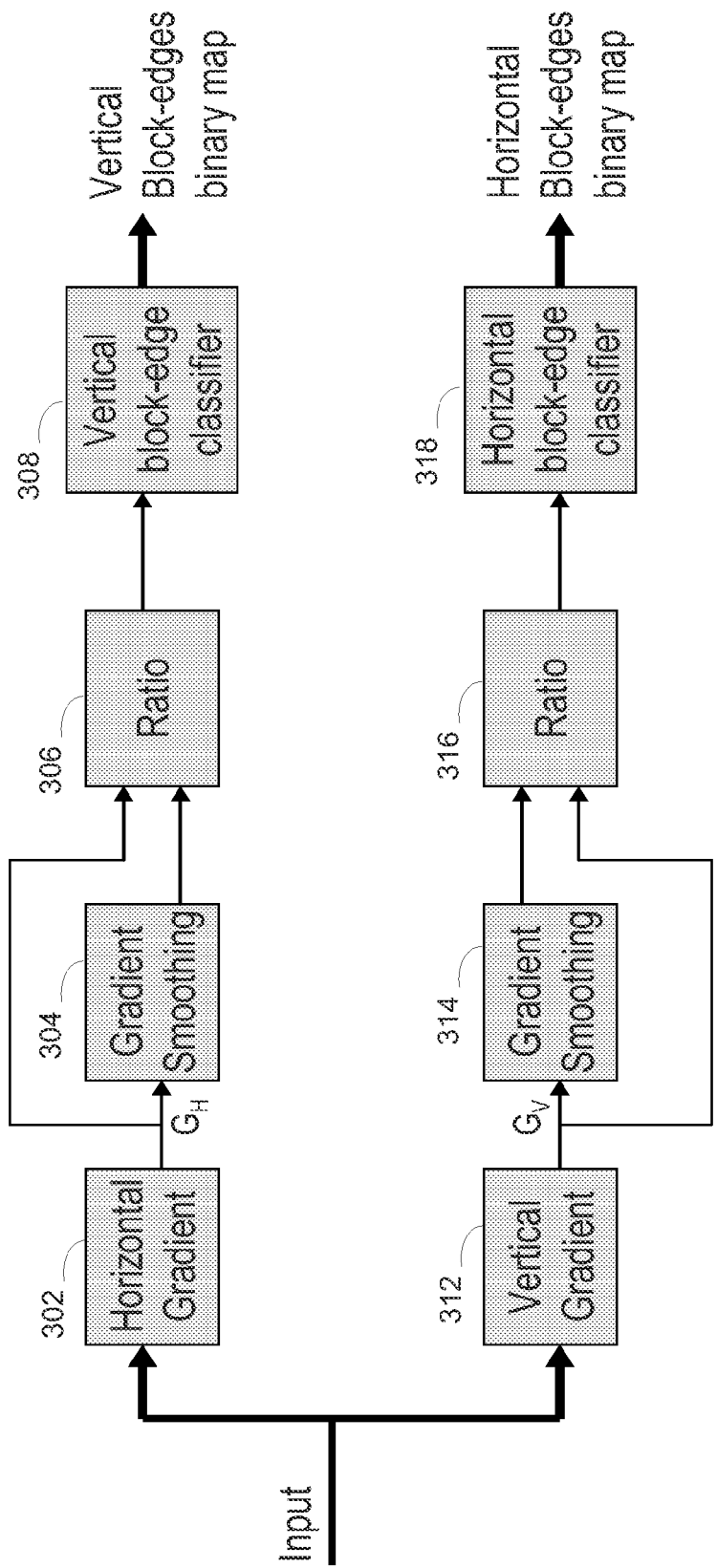
FIGS. 3 and 4 depict example systems that can be used to identify potential block-edges of vertical and horizontal block edges.

FIG. 3 depicts an example system that can be used to identify vertical and horizontal block edges. An input can be a compressed image or frame of video. The image can be compressed according to standards such as any form of MPEG or other image or video compression standard. Elements 302-308 can perform vertical block-edge classification. Horizontal gradient block 302 can determine a horizontal gradient to find sudden changes in intensity of a pixel. Horizontal gradient block 302 can perform operations described with regard to block 102 (FIG. 1). Gradient smoothing block 304 can apply low pass filtering on the horizontal gradient. Gradient smoothing block 304 can perform operations described with regard to block 104. Ratio block 306 can perform operations described with regard to block 106. Vertical block-edge classifier block 308 can determine whether a column of pixels include a blocking artifact. Vertical block-edge classifier block 308 can perform operations described with regard to blocks 108, 110, and 112.

Similar to vertical block-edge classification in blocks 302-308, respective blocks 312-318 perform operations to identify horizontal block-edge classifications for horizontal block edges. Vertical gradient block 312 can determine vertical gradient of a pixel. Gradient smoothing block 314 can apply low pass filtering on a vertical gradient. Ratio block 316 can determine a ratio of the vertical gradient over a low pass filtered version of the gradient in a similar manner to that of block 306. Horizontal block-edge classifier 318 can determine whether a row of pixels include a blocking artifact by performing operations similar to those described with regard to blocks 108, 110, and 112.

Figure 4:
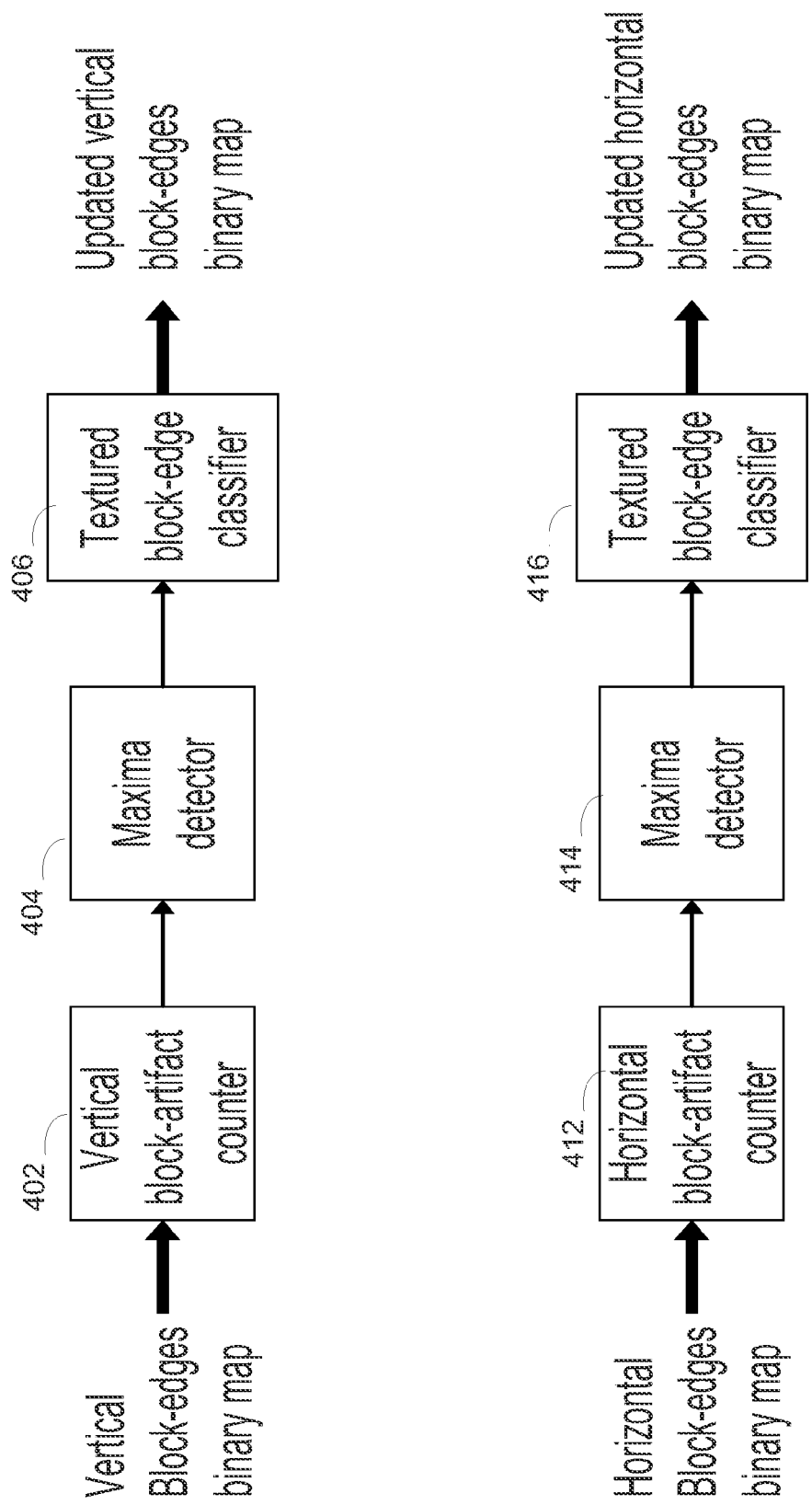

FIG. 4 depicts an example of a system that can identify vertical and horizontal block edges in textured regions. A binary map of vertical block-edges can be input to a vertical block-artifact counter 402. The map of block-edges determined using the process of FIG. 1 can be input to block 402. Vertical block-artifact counter 402 can determine a number of pixels in a column that include blocking artifacts. Vertical block-artifact counter 402 can perform the operations of block 202 of FIG. 2. Maxima detector 404 can determine whether the current column represents a local maximum of number of pixels in a column that include blocking artifacts. Maxima detector 404 can perform the operations of block 204 of FIG. 2. Textured block-edge classifier 406 can form a set of columns that have blocking artifacts. Columns can be considered to have blocking artifacts if the ratio of number of blocking artifacts in the column to number of pixels in a column exceeds a threshold. Textured block-edge classifier 406 can perform the operations of blocks 206 and 208.

For horizontal block-edges, horizontal block-artifact counter 412 can determine a number of pixels in a row that include blocking artifacts. Maxima detector 414 can determine whether the row that includes blocking artifacts has a local maximum of number of blocking artifacts relative to adjacent rows. Textured block-edge classifier 416 can classify the row as having a blocking artifact if a ratio of number of blocking artifacts in the row to the length of the row exceeds a threshold.

Figure 5:
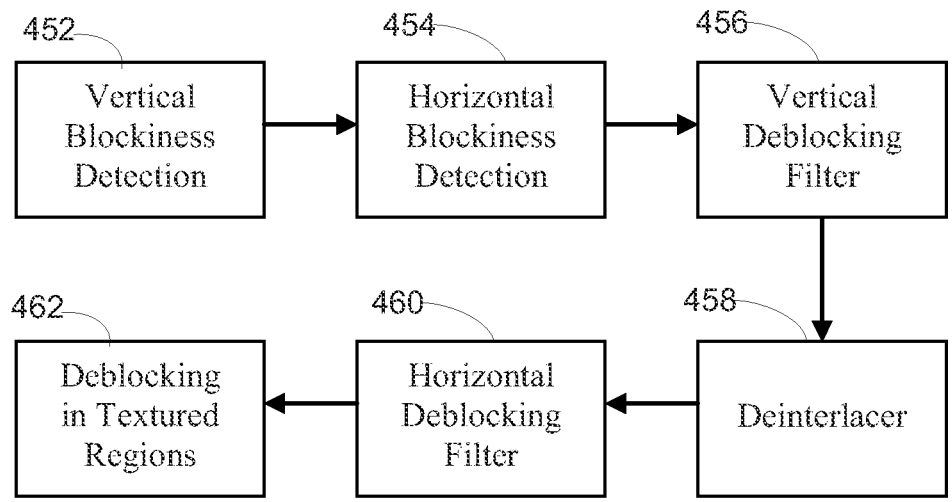
FIG. 5 depicts an example system that can be used to perform de-blocking of frames in interlaced video.

In interlaced video, two fields captured at different time instants are woven together to form a single interlaced frame. Interlaced content presents additional challenges to de-blocking. FIG. 5 depicts an example of a system that can be used to perform de-blocking of frames in interlaced video. Vertical blockiness detection block 452 can detect vertical blocking artifacts for artifacts in a frame with every other row of lines using a process described herein. Every other row of lines can be considered adjacent pixels. Horizontal detection block 454 can detect horizontal blocking artifacts using a process described herein. Vertical de-blocking filter 456 can apply de-blocking filtering based on horizontal gradients after vertical and horizontal blockiness detection. De-blocking filtering can take place based on the strength of blocking artifacts. De-interlacer 458 can perform de-interlacing on videos to produce a merged frame. Horizontal de-blocking filter 460 can perform horizontal de-blocking based on vertical gradients. De-blocking filtering can take place based on the strength of blocking artifacts. De-blocking in textured regions 462 can perform similar filtering as that in a smooth region in that the same type of bilateral filter can be used. The average strength of the blockiness can used to control the strength of the filter for all pixels in textured regions, rather than classifying artifacts as strong, medium and weak as can be done in smooth regions.

Filtering of horizontal blocking artifacts involves filtering in the vertical direction. Such an operation may not be performed on an interlaced frame (a frame in which both odd and even fields are interleaved). Filtering can take place on a single field, as opposed to a frame of interleaved fields, but there is a risk of causing excessive smoothing. This is because points that appear one pixel apart in the field are actually two pixels apart in the de-interlaced image. Thus, it may be desirable to perform vertical filtering after the de-interlacing operation.

On the other hand, de-interlacing can involve some type of interpolation of the missing field. A result of this is that blocking artifacts that appeared as true step-edges in a field may not be true step-edges after the de-interlacing operation is carried out. This may reduce the accuracy of detection of block artifacts. Thus, it may be preferable to perform detection before the de-interlacing operation.

Figure 6:
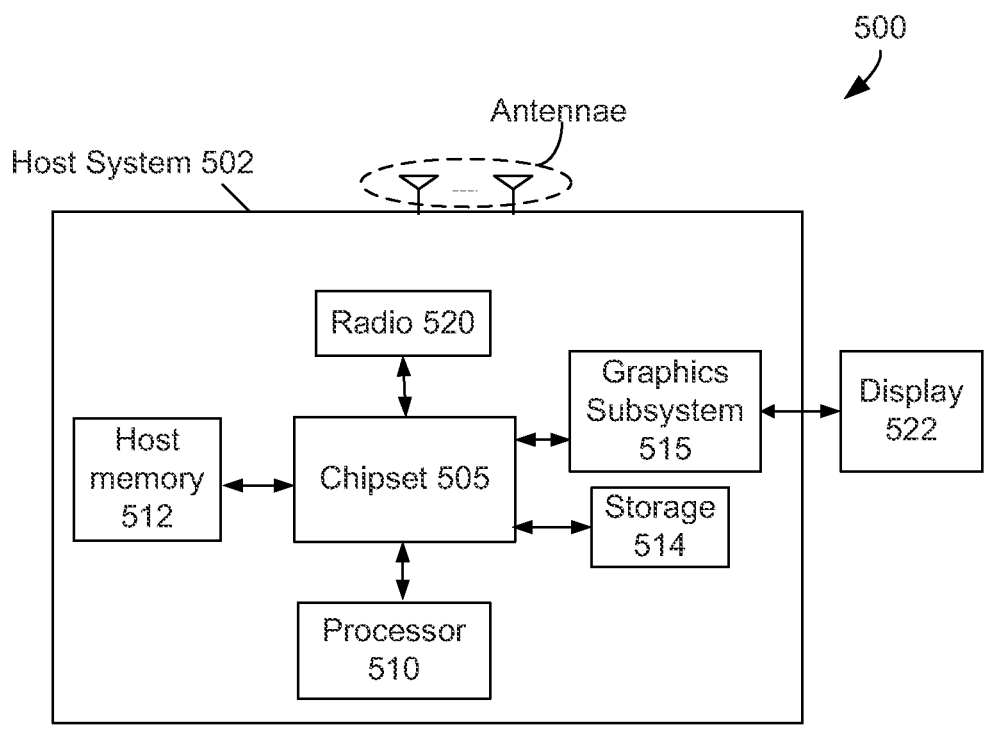
FIG. 6 depicts an example system in accordance with an embodiment.

FIG. 6 depicts an example system in accordance with an embodiment. Computer system 500 may include host system 502 and display 522. Computer system 500 can be implemented in a handheld personal computer, mobile telephone, set top box, or any computing device. Any type of user interface is available such as a keypad, mouse, and/or touch screen. Host system 502 may include chipset 505, processor 510, host memory 512, storage 514, graphics subsystem 515, and radio 520. Chipset 505 may provide intercommunication among processor 510, host memory 512, storage 514, graphics subsystem 515, and radio 520. For example, chipset 505 may include a storage adapter (not depicted) capable of providing intercommunication with storage 514.

Processor 510 may be implemented as Complex Instruction Set Computer (CISC) or Reduced Instruction Set Computer (RISC) processors, x86 instruction set compatible processors, multi-core, or any other microprocessor or central processing unit.

Host memory 512 may be implemented as a volatile memory device such as but not limited to a Random Access Memory (RAM), Dynamic Random Access Memory (DRAM), or Static RAM (SRAM). Storage 514 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 515 may perform processing of images such as still or video for display. An analog or digital interface may be used to communicatively couple graphics subsystem 515 and display 522. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505. In various embodiments, processor 510 and/or graphics subsystem 515 performs instructions that identify blocking artifacts and potentially correct blocking artifacts based on techniques described herein.

Radio 520 may include one or more radios capable of transmitting and receiving signals in accordance with applicable wireless standards such as but not limited to any version of IEEE 802.11 and IEEE 802.16. For example, radio 520 may include at least a physical layer interface and media access controller.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
identifying locations of potential blocking artifacts in an image without prior identification of coding parameters of a compressed version of the image, the image comprising multiple pixels, wherein the identifying locations of potential blocking artifacts comprises:
   determining a horizontal gradient for a selected pixel in the image;
   determining whether the horizontal gradient for the selected pixel differs from horizontal gradients of other pixels in the same row as that of the selected pixel in a manner that indicates a sudden change in pixel intensity;
   determining whether a length exceeds a threshold length, wherein the length is of adjacent pixels in the same column as that of the selected pixel and each of the adjacent pixels has a horizontal gradient that indicates a sudden change in pixel intensity relative to horizontal gradients of other pixels in its same row; and
   identifying the adjacent pixels as potentially having blocking artifacts in response to the length exceeding the threshold length;
determining strength of blocking artifacts in the image; and
applying filtering to the image based in part on the identified locations and the determined strength, wherein parameters used in applied filtering are selected based in part on the determined strength.

2. The method of claim 1, wherein the coding parameters comprise block size and quantization parameters.

3. The method of claim 1, wherein the determining whether the horizontal gradient for the selected pixel differs from horizontal gradients of other pixels in the same row as that of the selected pixel in a manner that indicates a sudden change in pixel intensity comprises:
   determining a gradient smoothing for pixels in the row of the selected pixel;
   determining a ratio of the horizontal gradient over the gradient smoothing; and
   determining whether the ratio of the gradient over the gradient smoothing is larger than a threshold.

4. The method of claim 1, further comprising:
   determining if a column with pixels that potentially have blocking artifacts has a local maximum number of blocking artifacts compared to adjacent columns of pixels;
   determining if there is a number of blocking artifacts in the column that exceeds a threshold; and
   identifying the column as including blocking artifacts in response to the column having a local maximum number of blocking artifacts and a number of blocking artifacts that exceeds the threshold.

5. The method of claim 1, further comprising:
   determining if a column with pixels that potentially have blocking artifacts has a local maximum ratio of number of blocking artifacts over number of pixels in the column compared to adjacent columns of pixels;
   determining whether a ratio of number of blocking artifacts over number of pixels in the column is larger than a threshold; and
   identifying the column as including blocking artifacts in response to the column having a local maximum and a ratio that is larger than the threshold.

6. The method of claim 5, further comprising:
   determining a strength of blocking artifacts for each column in a frame of the image.

7. An apparatus comprising:
blockiness detection logic configured to
   identify locations of potential blocking artifacts in an image without receipt of identification of coding parameters associated with a compressed version of the image, wherein to identify locations of potential blocking artifacts, the blockiness detection logic is to:
      determine a horizontal gradient for a selected pixel in the image;
      determine whether the horizontal gradient for the selected pixel when compared to horizontal gradients of other pixels in the same row as that of the selected pixel indicates a sudden change in pixel intensity;
      determine whether a length exceeds a threshold length, wherein the length is of adjacent pixels in the same column as that of the selected pixel and each of the adjacent pixels has a horizontal gradient that indicates a sudden change in pixel intensity; and
      identify the adjacent pixels as potentially having blocking artifacts in response to the length exceeding the threshold length;
   determine a strength of blocking artifacts in the image; and
a bilateral filter to apply filtering to the image based in part on the location and strength of blocking artifacts, wherein parameters used by the bilateral filter are selected based in part on the strength of blocking artifacts.

8. The apparatus of claim 7, wherein the coding parameters comprise block size and quantization parameters.

9. The apparatus of claim 7, wherein to determine whether the horizontal gradient for the selected pixel when compared to horizontal gradients of other pixels in the same row as that of the selected pixel indicates a sudden change in pixel intensity, the blockiness detection logic is to:
   determine a gradient smoothing for pixels in the row of the pixel;
   determine a ratio of the horizontal gradient over the gradient smoothing; and
   determine whether the ratio of the horizontal gradient over the gradient smoothing is larger than a threshold.

10. The apparatus of claim 7, wherein the blockiness detection logic is also to:
   determine if a column with pixels that potentially have blocking artifacts has a local maximum number of blocking artifacts compared to adjacent columns of pixels;
   determine if a number of blocking artifacts in the column exceeds a threshold; and
   identify the column as including blocking artifacts in response to the column having a local maximum number of blocking artifacts and a number of blocking artifacts that exceeds the threshold.

11. The apparatus of claim 10, wherein the blockiness detection logic is also to:
   determine a strength of blocking artifacts for each column in a frame of the image and
   determine a strength of blocking artifacts for each row in a frame of the image.

12. A system comprising:
a display;
at least one antenna;
a radio communicatively coupled to the at least one antenna; and
a computer communicatively coupled to the radio and the display, the computer configured to:
  identify locations of potential blocking artifacts independent of prior identification of coding parameters associated with a compressed version of the image, wherein to identify locations of potential blocking artifacts, the computer is to:
    determine a horizontal gradient for a selected pixel in the image,
    determine whether the horizontal gradient for the selected pixel relative to horizontal gradients of other pixels in the same row as that of the selected pixel indicates a sudden change in intensity,
    determine whether a length exceeds a threshold length, wherein the length is of adjacent pixels in the same column as that of the selected pixel and each of the adjacent pixels has a horizontal gradient that indicates a sudden change relative to other adjacent pixels in the same row, and
    identify the adjacent pixels as potentially having blocking artifacts in response to the length exceeding the threshold length;
  determine a strength of blocking artifacts in the image;
  select filter parameters based in part on the strength of blocking artifacts;
  apply filtering to the image based in part on the locations and strength of blocking artifacts, wherein to apply filtering, the computer is to use the selected filter parameters; and
  provide a filtered version of the image for display.

13. The system of claim 12, wherein the coding parameters comprise block size and quantization parameters.

14. The system of claim 12, wherein to determine whether the horizontal gradient for the pixel relative to horizontal gradients of other pixels in the same row indicates a sudden change in intensity, the computer is to:
  determine a gradient smoothing for pixels in the row of the pixel;
  determine a ratio of the horizontal gradient over the gradient smoothing; and
  determine whether the ratio of the horizontal gradient over the gradient smoothing is larger than a threshold.

15. The system of claim 12, wherein the computer is also configured to:
  determine if a column with pixels that potentially have blocking artifacts has a local maximum number of blocking artifacts compared to adjacent columns of pixels;
  determine if a number of blocking artifacts in the column exceeds a threshold; and
  identify the column as including blocking artifacts in response to the column having a local maximum number of blocking artifacts and a number of blocking artifacts exceeds the threshold.

16. The system of claim 12, wherein the computer is also configured to:
  determine a strength of blocking artifacts for each column in a frame of the image and
  determine a strength of blocking artifacts for each row in a frame of the image.

17. The method of claim 1, further comprising:
providing a filtered version of the image for display.

18. The apparatus of claim 7, further comprising:
logic to provide a filtered version of the image for display.

* * * * *